United States Patent
Tseng et al.

(10) Patent No.: US 9,630,504 B2
(45) Date of Patent: Apr. 25, 2017

(54) DISTANCE TO EMPTY PREDICTION WITH KINETIC ENERGY CHANGE COMPENSATION

(71) Applicant: Ford Global Technologies, LLC, Dearborn, MI (US)

(72) Inventors: Fling Tseng, Ann Arbor, MI (US); Sangeetha Sangameswaran, Canton, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/340,102

(22) Filed: Jul. 24, 2014

(65) Prior Publication Data
US 2016/0023554 A1    Jan. 28, 2016

(51) Int. Cl.
*B60L 3/12*        (2006.01)
*B60L 11/18*       (2006.01)
(Continued)

(52) U.S. Cl.
CPC   *B60L 3/12* (2013.01); *B60L 7/14* (2013.01); *B60L 11/14* (2013.01); *B60L 11/1861* (2013.01); *B60W 30/18127* (2013.01); *B60L 2260/52* (2013.01); *B60L 2260/54* (2013.01); *B60W 2510/18* (2013.01); *Y02T 10/7005* (2013.01)

(58) Field of Classification Search
CPC .. B60L 3/12; B60L 11/1861; B60W 30/18127
USPC ......................................................... 701/22
See application file for complete search history.

(56) References Cited

U.S. PATENT DOCUMENTS

| 7,400,104 B2 * | 7/2008 | Sato ........................ B60L 11/12 318/376 |
| 2012/0116620 A1 * | 5/2012 | Wang ..................... B60K 35/00 701/22 |

(Continued)

OTHER PUBLICATIONS

Lennon Patrick Rodgers, Electric Vehicle Design, Racing and Distance to Empty Algorithms, Submitted to the Department of Mechanical Engineering in Partial Fulfillment of the Requirements for the Degree of Doctor of Philosophy in Mechanical Engineering, Jun. 2013.

*Primary Examiner* — Yazan Soofi
(74) *Attorney, Agent, or Firm* — David B. Kelley; Brooks Kushman P.C.

(57) ABSTRACT

A method is provided for estimating distance to empty (DTE) for a vehicle. The method includes a controller which may, in response to detecting a change in a vehicle kinetic energy level due to vehicle acceleration or deceleration during a drive cycle, output a DTE modified by a predicted DTE range adjustment selected to include a kinetic energy compensation input corresponding to and correcting for the change in the vehicle kinetic energy level. An electrified vehicle having an energy conversion device, an energy source, one or more brake systems, and at least one controller is also provided. The controller may be programmed to, in response to detecting a change in a vehicle kinetic energy level due to vehicle acceleration or deceleration during a drive cycle, output a distance to empty to the interface based on conditions of vehicle components and the energy source compensated by a kinetic energy compensation input.

17 Claims, 4 Drawing Sheets

(51) Int. Cl.
*B60W 30/18* (2012.01)
*B60L 7/14* (2006.01)
*B60L 11/14* (2006.01)

(56) References Cited

U.S. PATENT DOCUMENTS

| | | | |
|---|---|---|---|
| 2012/0179319 A1* | 7/2012 | Gilman | B60W 50/0097 701/22 |
| 2012/0179420 A1* | 7/2012 | Gilman | B60K 35/00 702/165 |
| 2013/0009765 A1* | 1/2013 | Gilman | B60L 1/003 340/455 |
| 2013/0166123 A1* | 6/2013 | Donald, III | B60L 1/02 701/22 |
| 2013/0221741 A1 | 8/2013 | Stanek et al. | |
| 2013/0226377 A1 | 8/2013 | Stanek et al. | |
| 2014/0067225 A1* | 3/2014 | Lee | B60W 50/0097 701/93 |
| 2014/0149010 A1* | 5/2014 | Li | B60L 15/2045 701/70 |
| 2014/0203927 A1* | 7/2014 | Petit | B60R 16/0236 340/439 |
| 2015/0066343 A1* | 3/2015 | Ronning | G01F 9/023 701/123 |
| 2015/0134206 A1* | 5/2015 | Matsunaga | B60W 20/104 701/48 |
| 2015/0239455 A1* | 8/2015 | Qiu | B60W 10/08 701/22 |

* cited by examiner

DISTANCE TO EMPTY PREDICTION WITH KINETIC ENERGY CHANGE COMPENSATION

TECHNICAL FIELD

This disclosure relates to distance to empty prediction calculations for vehicles including an energy conversion device such as an electric machine or engine.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells. Vehicles with one or more HV batteries may include a battery management system that measures and/or estimates values descriptive of the HV battery, vehicle components, and/or battery cell present operating conditions. The battery management system may also output information relating to the measurements and estimates to an interface.

SUMMARY

A method for estimating distance to empty (DTE) for a vehicle includes, in response to detecting a change in a vehicle kinetic energy level due to vehicle acceleration or deceleration during a drive cycle, outputting by a controller a DTE modified by a predicted DTE range adjustment selected to include a kinetic energy compensation input corresponding to and correcting for the change in the vehicle kinetic energy level. The vehicle deceleration may be due to an application of a friction brake system, and the kinetic energy compensation input may compensate and correct for a change in kinetic energy based on a friction braking power value related to an amount of kinetic energy dissipated from the application of the friction brake system. The vehicle deceleration may be due to an application of a regenerative brake system, and the kinetic energy compensation input may compensate and correct for a change in kinetic energy based on the friction braking power value and an amount of kinetic energy recaptured from the application of the regenerative brake system. The DTE may be based on a historical energy consumption rate and a modified energy available value. The modified energy available value may be based on a measured amount of energy available and a kinetic energy modifier. The kinetic energy modifier may be based on a friction braking energy value and a kinetic energy change based on a change in vehicle speed. The friction braking energy may be based on a friction braking power value and the kinetic energy change.

An electrified vehicle includes an energy conversion device, an energy source to supply power to the energy conversion device, a friction brake system, a regenerative brake system to recover kinetic energy when a speed of the vehicle decreases, and at least one controller in communication with the brake systems and an interface. The controller is programmed to, in response to detecting a change in a vehicle kinetic energy level due to vehicle acceleration or deceleration during a drive cycle, output a distance to empty (DTE) to the interface based on conditions of vehicle components and the energy source compensated by a kinetic energy compensation input. The vehicle deceleration may be due to an application of the friction brake system, and the kinetic energy compensation input may compensate and correct for the change in the vehicle kinetic energy level based on a friction braking power value related to an amount of kinetic energy dissipated from the application of the friction brake system. The vehicle deceleration may be due to an application of the regenerative brake system, and the kinetic energy compensation input may compensate and correct for a vehicle kinetic energy change based on the friction braking power value and an amount of kinetic energy recaptured from the application of the regenerative brake system. The kinetic energy compensation input may be based on an estimated amount of recoverable kinetic energy. The recoverable kinetic energy may be a function of the energy dissipated due to friction braking, the energy recaptured due to regenerative braking, and the vehicle kinetic energy based on vehicle speed. The controller may be further programmed to, in response to detecting the vehicle acceleration and the friction braking energy equaling zero, output an updated DTE based on an increased amount of recoverable kinetic energy resulting from the change in the vehicle kinetic energy. The controller may be further programmed to, in response to detecting vehicle deceleration, output an updated DTE based on recoverable kinetic energy and dissipated friction braking energy. The controller may be further programmed to, in response to detecting vehicle acceleration and the friction braking energy having a finite value, output an updated DTE based on a friction braking energy level due to the vehicle kinetic energy change and a constant recoverable kinetic energy value.

A vehicle traction battery system includes one or more vehicle components, a traction battery to supply energy to the vehicle components, a friction brake system, a regenerative brake system, one or more sensors to monitor the vehicle components, traction battery, and braking systems, and a controller. The controller is configured to receive input from the sensors, to detect a friction braking power level and a vehicle kinetic energy change due to conditions of the brake systems based on the input, and to output a distance to empty (DTE) modified by a kinetic energy modifier derived from the input and selectively applied according to the conditions of the brake systems. The controller may be further configured to, in response to detecting vehicle deceleration, output an updated DTE based on energy recovered from the regenerative brake system and an amount of energy dissipated. The controller may be further configured to, in response to detecting vehicle acceleration and a friction braking energy equal to zero, output an updated DTE based on a recoverable kinetic energy and the vehicle kinetic energy change. The DTE may be based on energy dissipated during an application of the friction brake system, and the kinetic energy modifier may compensate and correct for the vehicle kinetic energy change based on the friction braking power level related to an amount of unrecovered kinetic energy resulting from the application of the friction brake system. The DTE may be based on energy recaptured during an application of the regenerative brake system, and the kinetic energy modifier may compensate and correct for the vehicle kinetic energy change based on the friction braking

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
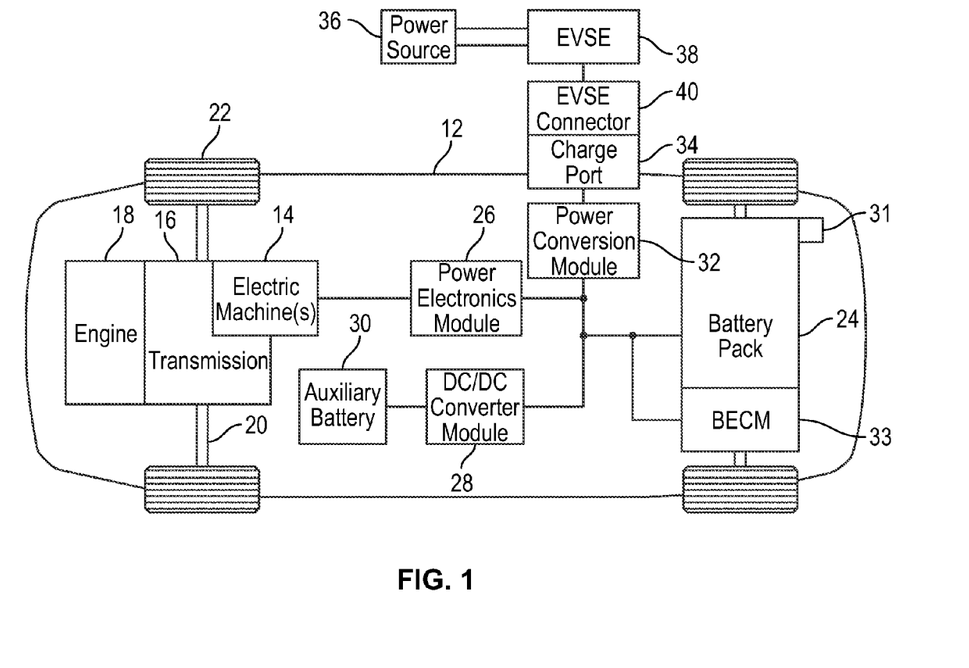
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

Accurately understanding energy consumption properties of various vehicle components is an integral part of estimating a distance to empty (DTE) range of vehicles having an energy conversion device, such as an engine or electric machine, and an energy source, such as a fuel tank or HV battery. In one example, DTE may be estimated based on a learned energy consumption rate and an amount of available energy. Multiple noise factors exist which may present challenges to estimating DTE under this approach. Some of these noise factors may change over an extended time scale while other noise factors may periodically change over a shorter time scale. Examples of noise factors may include vehicle mass/towing mass, vehicle condition which affects aerodynamic drag, tire characteristics, cabin temperature, climate control settings, coolant and oil temperature, ambient temperature, ambient pressure, precipitation, wind speed and direction, traffic, elevation, road grade, driving style, and braking habits.

Examples of noise factors which tend to change over an extended time scale include ambient temperature changes and tire deflation. Examples of noise factors which tend to periodically change over a shorter time scale include oil warm-up and cabin heating/cooling. Additionally, certain noise factors, such as elevation and posted speed limits, may change over an extended time scale or a shorter time scale. Energy consumption over a fixed time scale may be observed to learn the energy consumption efficiency. However, the above described approach may not distinguish between short-term fluctuations in energy consumption (which should be compensated but not projected forward) and longer term shifts in energy consumption (which should be projected forward to empty). If a time scale is too long, then an average effect of noise factors which tend to change over shorter time scales may be well captured, but the estimation may respond very slowly to noise factors which tend to change over extended time scales. Conversely, a short time scale may allow the estimation to adeptly capture the effects of noise factors which tend to vary over extended time scales, but the estimation may be susceptible to an over correction for noise factors which tend to change over shorter time scales. In either case, a common result may be an inaccurate estimation for DTE.

For example, an energy consumption rate for a vehicle during the first few minutes of a key on cycle or vehicle start may be greater, in certain circumstances as high as double, than the normal energy consumption rate of the vehicle. The above approach may over-predict DTE at the key on stage or vehicle start and then may over compensate for the observed high energy consumption rate which may result in underestimating DTE. Further, multiple short trips may cause the estimated DTE to oscillate such that a driver does not have clarity on the vehicle range. This type of inaccuracy may lead to driver dissatisfaction and particularly to drivers of BEVs and PHEVs.

In another example, energy consumption increases during an acceleration by the vehicle. When this energy consumption increase is included in a calculation of average energy consumption efficiency, the DTE calculation may project that the vehicle will continue to consume energy at the level consumed during the acceleration, which is typically not an accurate reflection of energy consumption during a drive cycle. Similarly, during a braking event on a vehicle with a regenerative braking capability, an energy consumption rate may be calculated as a negative value due to recovered energy from the regenerative braking. However, recovering energy through regenerative braking does not continue indefinitely so a DTE calculation which does not accurately compensate for the regenerative braking relative to a drive cycle will also be inaccurate.

Figure 2:
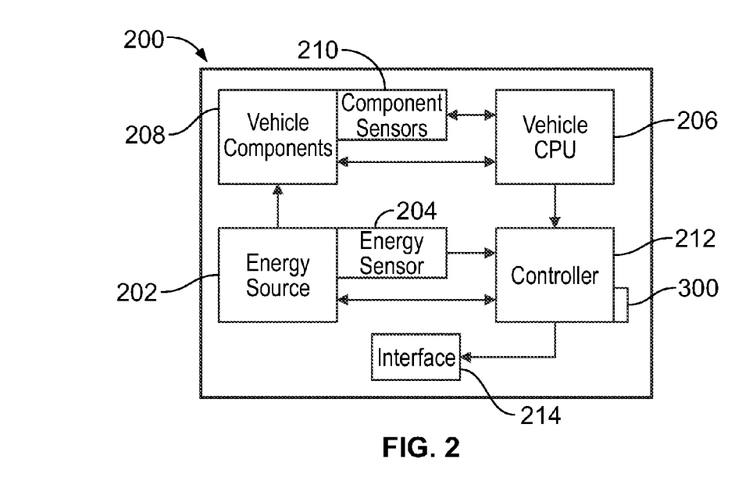
FIG. 2 is a block diagram illustrating an example of a vehicle.

FIG. 2 shows a vehicle 200 which may include an energy source 202. The vehicle 200 may be, for example, an electrified vehicle with a friction brake system and a regenerative brake system. An energy sensor 204 may be in communication with the energy source 202, such as an HV battery pack, to measure power levels of battery cells within the HV battery pack. The energy sensor 204 for an HV battery pack may include a current sensor, a voltage sensor, and an accompanying battery control unit. The energy sensor 204 may be located in a suitable position including within, adjacent to, or proximate to the energy source 202. A vehicle computer processing unit ("CPU") 206 may be in communication with a plurality of vehicle components 208 and a plurality of component sensors 210 such that the CPU 206 may receive information regarding the vehicle components 208 and also direct operation thereof. Non-limiting examples of vehicle components 208 may include an engine, a transmission, a differential, an after treatment system, a lubrication system, one or more electric motors, electric machines, tires, a cabin climate control system, a brake system, a battery pack thermal management system, an engine thermal management system, and an electric machine thermal management system.

The brake system may include components to facilitate friction braking and regenerative braking of the vehicle 200. For example, a friction brake system may include a brake pedal, a brake boost (vacuum servo), a master cylinder, apportioning valves, and roadwheel brakes. The friction brake system may slow vehicle speed by converting the kinetic energy of the vehicle 200 into heat which may then be dissipated into the atmosphere. A regenerative brake system may include a braking controller and an electric motor in communication with an axle having one or more wheels fixed thereto. The braking controller may manage the transfer of energy from the regenerative braking to the energy source 202 and determine whether to apply the friction brake system under certain circumstances. When current through the electric motor runs in a first direction, the electric motor may convert electrical energy into mechanical energy. The electric motor may operate as an electric generator when the current through the electric motor is run in a second direction to slow the vehicle 200 and may convert mechanical energy into electrical energy which may then be supplied to vehicle's energy source 202. Accordingly, when the regenerative brakes of the vehicle 200 are applied, kinetic energy may be transferred to the energy source 202.

The component sensors 210 may include sensors appropriate to measure conditions of the corresponding vehicle component 208. For example, the energy sensor 204 may be a battery state of charge estimator. As another example, the component sensors 210 may include sensors to measure friction brake torque and wheel speed. A controller 212 may be in communication with the vehicle CPU 206, the energy sensor 204, and the energy source 202 to receive information relating to the vehicle components 208 and the energy source 202. The controller 212 may also be in communication with an interface 214 located in a cabin of the vehicle 200 to display and/or communicate information relating to the vehicle components 208 and the energy source 202.

Figure 3:
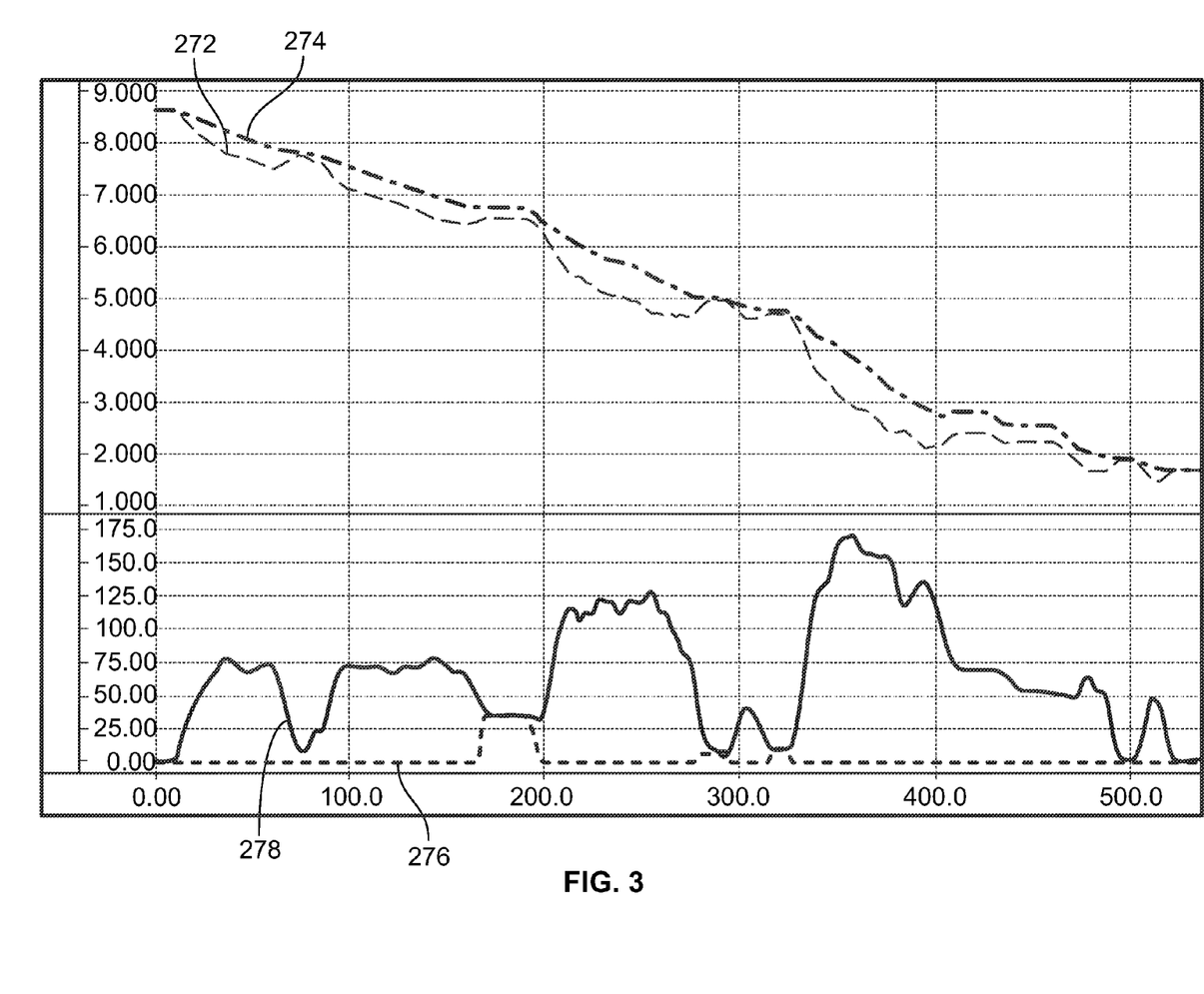
FIG. 3 is a graph illustrating a comparison between an energy consumption rate calculated with and without a kinetic energy compensation modifier.

FIG. 3 is a graph showing examples of two DTE calculation plots and two plots relating to kinetic energy of the vehicle 200 over a drive cycle. A x-axis represents a distance of the drive cycle and two y-axes represent a power level of the energy source 202 and a kinetic energy output, respectively. A DTE without kinetic energy compensation plot 272 is shown which may represent DTE calculations taken without utilizing a kinetic energy modifier. For example, the DTE without kinetic energy compensation plot 272 may be based on a learned energy consumption rate of the vehicle 200, however the learned energy consumption rate used in the DTE calculations may not accurately account for changes in recovered and unrecovered kinetic energy. During acceleration of the vehicle 200, for example, energy consumption by the vehicle 200 increases for a certain period of time but then decreases so the effect on DTE should not be projected at the increased rate throughout the drive cycle. During vehicle 200 braking, for example, energy consumption by the vehicle 200 may decrease for a certain time period due to regenerative braking so the effect on DTE should not be projected at the decreased rate throughout the drive cycle. A friction braking energy plot 276 may be a plot representing the energy dissipated resulting from application of the friction braking system of the vehicle 200 during the drive cycle. When the friction braking energy plot 276 is increasing, the friction braking system is active which may be due to a scenario in which application of the regenerative braking system by itself was not enough to slow the vehicle 200. Whenever the friction braking energy plot 276 is positive and the vehicle 200 accelerates, the friction braking energy plot 276 decreases to compensate for the effect of lost kinetic energy. As shown in FIG. 3, the DTE without kinetic energy compensation plot 272 is not a smooth curve for a majority of the drive cycle which may result in inaccurate and oscillating DTE information output to the interface 214 due to inaccurate kinetic energy compensation.

A kinetic energy modifier plot 278 may be a plot representing a kinetic energy modifier input which may assist in compensating for changes in recoverable and unrecovered kinetic energy during the drive cycle. For example, a DTE with kinetic energy compensation plot 274 includes the kinetic energy modifier input in DTE calculations and may represent an application of a learning filter to recoverable and unrecovered kinetic energy factors which may, for example, relate to vehicle acceleration, friction braking, and regenerative braking. Compensating for changes in recovered and unrecovered kinetic energy factors may provide a more accurate energy consumption efficiency estimate and thus positively impact DTE calculations. The kinetic energy modifier plot 278 may represent a correction factor which may assist in modifying an instantaneous power consumption value of the vehicle 200 to compensate for the effects of changes in recovered kinetic energy before calculating DTE. As shown with the DTE with kinetic energy compensation plot 274, utilizing the kinetic energy modifier provides a substantially smooth and monotonically decreasing curve even with what may be considered somewhat erratic braking applications represented by the friction braking energy plot 276.

Figure 4:
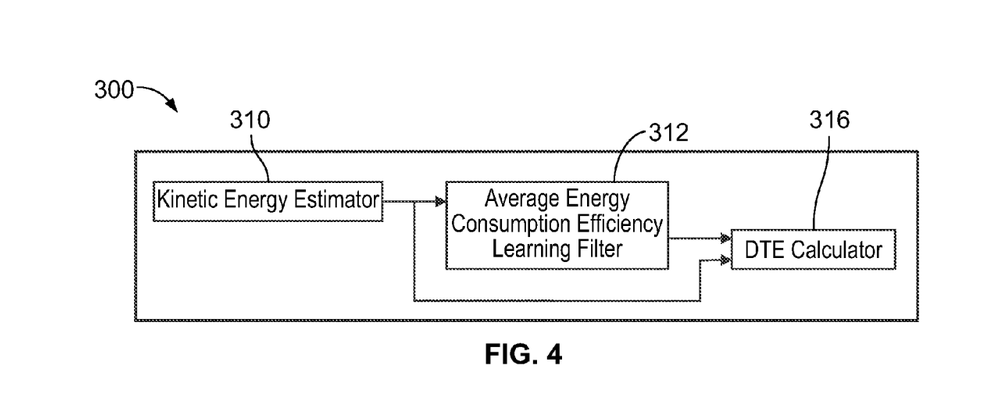
FIG. 4 is a block diagram of an example of a distance to empty prediction architecture for the vehicle of FIG. 2.

FIG. 4 shows one example of a DTE prediction architecture, referenced generally by numeral 300, which may include a kinetic energy estimator 310, an average energy consumption efficiency learning filter 312, and a DTE calculator 316. The DTE prediction architecture 300 may be in communication with the controller 212. The kinetic energy estimator 310 may include transfer function models for the vehicle components 208. The transfer function models may each consider signals from the component sensors 210 relating to the according vehicle components 208 as inputs. For example, the component sensors 210 may measure one or more vehicle 200 input factors, such as vehicle speed and a friction braking torque, for input into a kinetic energy estimator. Based on the inputs, the kinetic energy estimator 310 may estimate a friction braking power based on the measured vehicle speed and friction braking torque. The average energy consumption efficiency learning filter 312 may calculate a change in the kinetic energy modifier between updates. The average energy consumption efficiency learning filter 312 may also update the historical energy consumption rate based on the energy consumed since a previous update, the change in the kinetic energy modifier, and the distance traveled since the previous update. The DTE calculator 316 may calculate a modified energy available based on the energy available and the kinetic energy modifier. The DTE calculator 316 may also calculate a DTE based on the historical energy consumption rate and the modified energy available.

Figure 5:
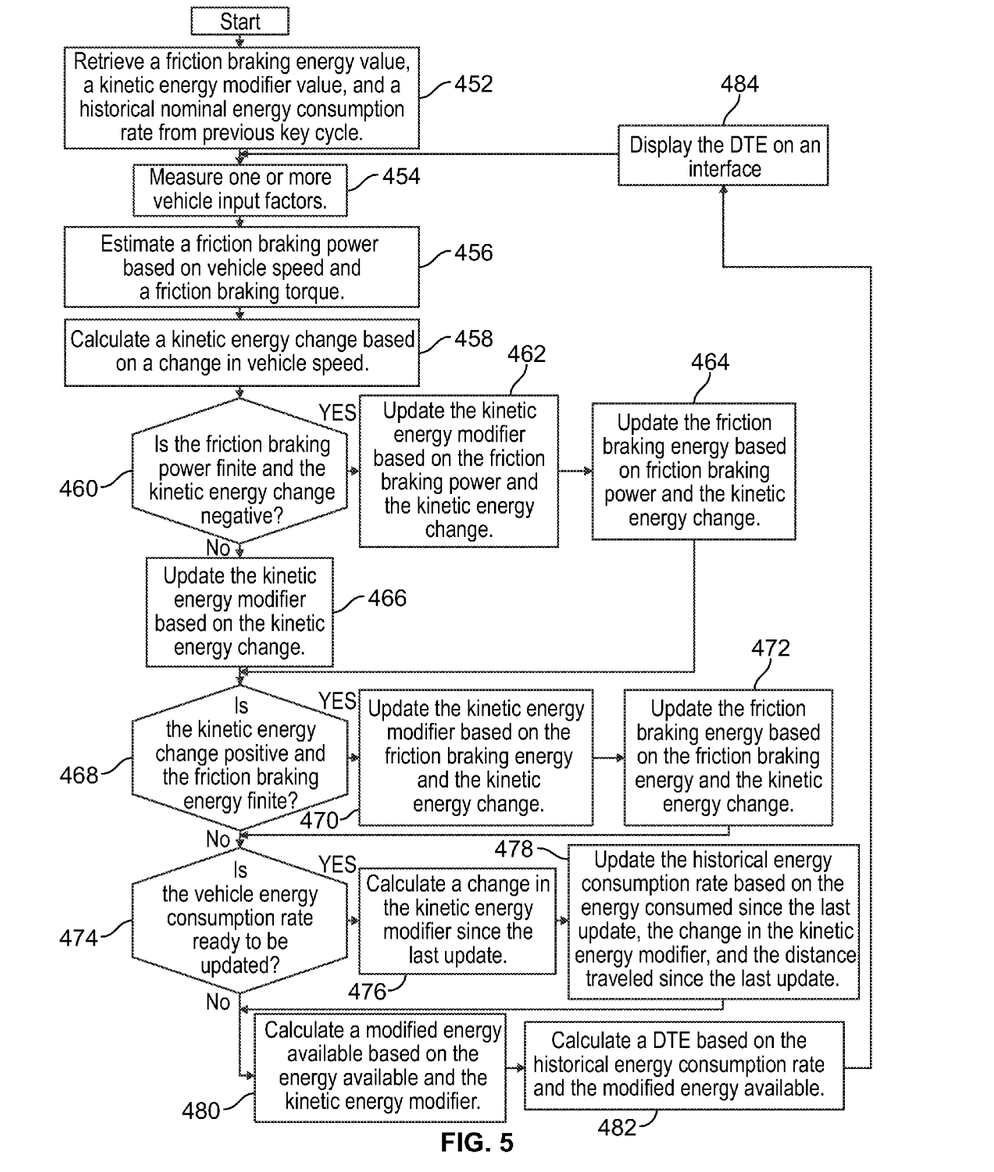
FIG. 5 is a flow chart illustrating an example of an algorithm for operation of the distance to empty prediction architecture from FIG. 4.

FIG. 5 shows an example of an algorithm for calculating a modified DTE for an electrified vehicle with a regenerative braking system which may compensate for recoverable and unrecovered kinetic energy of the vehicle. The algorithm is generally indicated by reference numeral 450. In operation 452, a controller may retrieve a friction braking energy value, a kinetic energy modifier value, and a historical nominal energy consumption rate from information relating to a previous drive cycle of a vehicle. In operation 454, one or more sensors may measure one or more vehicle input factors, such as vehicle speed and a friction braking torque, for input into a kinetic energy estimator. In operation 456, the kinetic energy estimator may estimate a friction braking power based on the measured vehicle speed and friction braking torque. For example, the friction braking power may be estimated according to:

$$P_{friction\ braking} = \frac{1}{R_{wheel}} Tq_{friction\ braking} V$$

Where $Tq_{friction\ braking}$=friction braking torque, V=vehicle speed, and $R_{wheel}$=wheel radius.

In operation 458, the kinetic energy estimator may calculate a kinetic energy change based on a change in vehicle speed. For example, the kinetic energy change may be calculated according to:

$$E_{kinetic, change} = \tfrac{1}{2}m(V^2 - V_{last}^2)$$

Where V=the measured vehicle speed, $V_{last}$=a vehicle speed from a previous calculation loop, and m=a mass of the vehicle.

If the controller detects a finite condition of the friction braking power and a negative kinetic energy change in operation 460, the kinetic energy estimator may update a kinetic energy modifier based on the estimated friction braking power and the calculated kinetic energy change in operation 462. If friction braking is utilized to decelerate the vehicle, the algorithm may decrease the kinetic modifier by an amount of the kinetic energy that was actually recovered. The amount of kinetic energy that was not recovered may be tracked for later kinetic energy compensation. For example, the kinetic energy modifier may be calculated according to:

$$E_{kinetic} = \max(0, E_{kinetic} + \max(0, t_{loop\ cycle} P_{friction\ braking} + E_{kinetic, change}))$$

Where $t_{loopcycle}$=a loop cycle time.

In operation 464, a friction braking energy value may be updated by the kinetic energy estimator based on the friction braking power and the kinetic energy change. For example, the friction braking energy may be calculated according to:

$$E_{friction\ braking} = E_{friction\ braking} + \max(t_{loop\ cycle} P_{friction\ braking}, -E_{kinetic, change})$$

The controller may then ensure that the following conditions are enforced moving forward:

$$E_{friction\ braking} = \min(E_{friction\ braking}, E_{kinetic})$$

If the controller does not detect a finite condition of the friction braking power or a negative value for the kinetic energy in operation 460, e.g. friction braking is not utilized, the kinetic energy estimator may update the kinetic energy modifier based on the kinetic energy change in operation 466. For example, the kinetic energy modifier may be calculated according to:

$$E_{kinetic} = \max(0, E_{kinetic} + E_{kinetic, change})$$

If the controller detects a positive kinetic energy change and a finite condition of the friction braking energy in operation 468, the kinetic energy estimator may adjust the kinetic energy modifier with an energy correction factor which corrects for unrecovered kinetic energy based on the friction braking energy and the kinetic energy change in operation 470. For example, the energy correction factor may be calculated according to:

$$E_{kinetic\ corr} = \min(E_{kinetic}, \min(E_{kinetic\ change}, E_{friction\ braking}))$$

Further, In operation 472, the kinetic energy estimator may update the friction braking energy and the kinetic energy modifier based on the friction braking energy and the kinetic energy change according to:

$$E_{kinetic} = E_{kinetic} - E_{kinetic\ corr}$$

$$E_{friction\ braking} = E_{friction\ braking} - E_{kinetic\ corr}$$

Where $E_{kinetic,\ change}$=kinetic energy change, $P_{friction\ braking}$=friction braking power, $E_{kinetic\ corr}$=kinetic energy modification, $E_{friction\ braking}$=friction braking energy, and $t_{loop\ cycle}$=the loop cycle time.

Under certain conditions, vehicle acceleration should decrease the friction braking energy proportional to the kinetic energy change until all or most of the friction braking energy is compensated which correspondingly decreases the kinetic energy modifier. A net result of the above conditions may include a decrease to the kinetic energy modifier during vehicle acceleration if the friction braking energy is finite. Additionally, by proportionally decreasing the friction braking energy, the interface may display an effect of the regenerative braking performance to assist in providing insight into how various braking applications effect energy consumption.

If the controller determines that the vehicle energy consumption rate is ready to be updated in operation 474, e.g. a predetermined time or distance has elapsed, an average energy consumption learning filter may calculate the change in the kinetic energy modifier since the previous update in operation 476. Further, in operation 478 the average energy consumption learning filter may update the historical energy consumption rate based on the energy consumed since the previous update, the change in the kinetic energy modifier, and the distance traveled since the last update. If the vehicle energy consumption rate is not ready to be updated in operation 474, a DTE calculator may calculate a modified energy available based on the energy available and the kinetic energy modifier in operation 480. In operation 482, the DTE calculator may calculate a DTE based on the historical energy consumption rate and the modified energy available. In operation 484, DTE calculator may output the DTE to an interface. As described above, the DTE output to the interface may represent a modification of instantaneous power consumption by the vehicle to compensate for effects of vehicle acceleration and regenerative braking on DTE. Further, the effects of vehicle acceleration and regenerative braking may be excluded when learning the average energy consumption efficiency so the effects are not inappropriately projected forward.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle distance to empty (DTE) estimation method comprising:
    responsive to detecting a kinetic energy change due to drive cycle acceleration or brake deceleration, outputting a DTE modified by a predicted DTE adjustment including predicted data based on an estimator created input compensating and correcting for kinetic energy change derived from measured and previous vehicle speed and vehicle mass, and based on a power value related to kinetic energy dissipated from a friction brake application.

2. The method of claim 1, wherein the estimator created input compensates and corrects for a change in kinetic energy based on the braking power value and an amount of kinetic energy recaptured from application of a regenerative brake system.

3. The method of claim 1, wherein the DTE is based on a historical energy consumption rate and a modified energy available value.

4. The method of claim 3, wherein the modified energy available value is based on a measured amount of energy available and a kinetic energy modifier.

5. The method of claim 4, wherein the kinetic energy modifier is based on a friction braking energy value and a kinetic energy change based on a change in vehicle speed.

6. The method of claim 5, wherein the friction braking energy is based on a friction braking power value and the kinetic energy change.

7. An electrified vehicle comprising:
an energy conversion device;
an energy source to supply power to the energy conversion device;
a friction brake system;
a regenerative brake system to recover kinetic energy when a speed of the vehicle decreases; and
at least one controller in communication with the brake systems and an interface, and programmed to, in response to detecting a change in a vehicle kinetic energy level due to vehicle acceleration or deceleration during a drive cycle, output a distance to empty (DTE) including predicted data and calculated by a kinetic energy estimator, an average energy consumption efficiency learning filter, and a DTE calculator to the interface based on conditions of vehicle components and the energy source compensated by a kinetic energy compensation input based on a measured vehicle speed, a previous vehicle speed, and a vehicle mass, wherein an estimator created input is based on a friction braking power value related to kinetic energy dissipated from a friction brake application.

8. The vehicle of claim 7, wherein the vehicle deceleration is due to an application of the regenerative brake system, and wherein the kinetic energy compensation input compensates and corrects for a vehicle kinetic energy change based on the friction braking power value and an amount of kinetic energy recaptured from the application of the regenerative brake system.

9. The vehicle of claim 8, wherein the kinetic energy compensation input is based on an estimated amount of recoverable kinetic energy.

10. The vehicle of claim 9, wherein the recoverable kinetic energy is a function of the energy dissipated due to friction braking, the energy recaptured due to regenerative braking, and the vehicle kinetic energy based on vehicle speed.

11. The vehicle of claim 10, wherein the controller is further programmed to, in response to detecting the vehicle acceleration and the friction braking energy equaling zero, output an updated DTE based on an increased amount of recoverable kinetic energy resulting from the change in the vehicle kinetic energy.

12. The vehicle of claim 10, wherein the controller is further programmed to, in response to detecting vehicle deceleration, output an updated DTE based on recoverable kinetic energy and dissipated friction braking energy.

13. The vehicle of claim 9, wherein the controller is further programmed to, in response to detecting vehicle acceleration and the friction braking energy having a finite value, output an updated DTE based on a friction braking energy level due to the vehicle kinetic energy change and a constant recoverable kinetic energy value.

14. A vehicle traction battery system comprising:
one or more vehicle components;
a traction battery to supply energy to the vehicle components;
a friction brake system;
a regenerative brake system;
one or more sensors to monitor the vehicle components, traction battery, and braking systems; and
a controller configured to receive input from the sensors, to detect a friction braking power level and a vehicle kinetic energy change due to conditions of the brake systems based on the input, and to output a distance to empty (DTE) including predicted data modified by a kinetic energy modifier derived from the input, based on a measured vehicle speed, a previous vehicle speed, and a vehicle mass, and selectively applied according to the conditions of the brake systems, wherein the kinetic energy modifier compensates and corrects for the vehicle kinetic energy change based on the friction baking power level related to an amount of unrecovered kinetic energy resulting from application of the friction brake system.

15. The system of claim 14, wherein the controller is further configured to, in response to detecting vehicle deceleration, output an updated DTE based on energy recovered from the regenerative brake system and an amount of energy dissipated.

16. The system of claim 14, wherein the controller is further configured to, in response to detecting vehicle acceleration and a friction braking energy equal to zero, output an updated DTE based on a recoverable kinetic energy and the vehicle kinetic energy change.

17. The system of claim 14, wherein the DTE is based on energy recaptured during an application of the regenerative brake system, and wherein the kinetic energy modifier compensates and corrects for the vehicle kinetic energy change based on the friction braking power level and an amount of recovered kinetic energy resulting from the application of the regenerative brake system.

* * * * *